United States Patent
Byun et al.

(10) Patent No.: US 7,420,783 B2
(45) Date of Patent: Sep. 2, 2008

(54) SLIM ACTUATOR AND SLIM MICRO-DRIVE APPARATUS COMPRISING THE SAME

(75) Inventors: Yong-kyu Byun, Kyungki-do (KR); Min-pyo Hong, Kyungki-do (KR); Woo-sup Han, Kyungki-do (KR)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 261 days.

(21) Appl. No.: 10/445,208

(22) Filed: May 27, 2003

(65) Prior Publication Data
US 2004/0090713 A1 May 13, 2004

(30) Foreign Application Priority Data
Nov. 12, 2002 (KR) .............. 10-2002-0070064

(51) Int. Cl.
*G11B 21/16* (2006.01)
*G11B 5/48* (2006.01)

(52) U.S. Cl. .............. 360/265.7; 360/265.9; 360/266.1; 360/245.5

(58) Field of Classification Search .............. 360/264.7, 360/265, 265.7, 265.8, 265.9, 266.1, 264.2, 360/245.5, 245.8, 244.5
See application file for complete search history.

(56) References Cited

U.S. PATENT DOCUMENTS

| | | | | |
|---|---|---|---|---|
| 4,314,295 A | * | 2/1982 | Frandsen | 360/266.9 |
| 5,539,596 A | * | 7/1996 | Fontana et al. | 360/244.4 |
| 5,970,602 A | * | 10/1999 | Harada et al. | 29/603.06 |
| 6,282,064 B1 | * | 8/2001 | Palmer et al. | 360/245.9 |
| 6,507,459 B1 | * | 1/2003 | Kamigama | 360/245.9 |
| 6,507,463 B1 | * | 1/2003 | Boutaghou | 360/294.3 |
| 6,687,095 B2 | * | 2/2004 | McReynolds et al. | 360/265.8 |

FOREIGN PATENT DOCUMENTS

| | | | |
|---|---|---|---|
| JP | 05198115 A | * | 8/1996 |
| JP | 11096746 A | * | 4/1999 |
| JP | 2000-268513 | | 9/2000 |
| JP | 2004-048825 | | 12/2004 |

OTHER PUBLICATIONS

Full English-language translation of Endo (JP 05-198115 A).*
Korean Patent Office Action and English Translation.
Japanese Office Action JP 2003-382423 dated Mar. 10, 2006.

* cited by examiner

*Primary Examiner*—William J Klimowicz
(74) *Attorney, Agent, or Firm*—Buchanan Ingersoll & Rooney PC

(57) ABSTRACT

A slim actuator and a micro-drive apparatus using the same are provided. The slim actuator includes a suspension having a head mounted at one end of the suspension to write/read data to/from a disk and a head gimbal assembly. The head gimbal assembly includes a unit-mounting portion having one end connected to the suspension, a fantail molding portion extending from the other end of the uni-mounting portion, and a voice coil which is mounted on the fantail mounting portion such that current flows in the voice coil. The voice coil rotates the suspension by an electromagnetic force created by interaction between the electric field of the current and an applied magnetic field. Thus, the slim actuator uses a single channel and has excellent resonance characteristics. Mobile micro-drive apparatuses employing the slim actuators can be obtained.

7 Claims, 7 Drawing Sheets

SLIM ACTUATOR AND SLIM MICRO-DRIVE APPARATUS COMPRISING THE SAME

BACKGROUND OF THE INVENTION

This application claims the priority of Korean Patent Application No. 2002-70064 filed on Nov. 12, 2002, in the Korean Intellectual Property Office, the disclosure of which is incorporated herein in its entirety by reference.

1. Field of the Invention

The present invention relates to an actuator and a micro-drive apparatus including the actuator, and more particularly, to a slim actuator improved for use in mobile micro-drive apparatuses and a slim micro-drive apparatus comprising the slim actuator.

2. Description of the Related Art

FIG. 1A is a plan view of a conventional actuator 10 included in an existing IBM micro-drive apparatus, and FIG. 1B is a side cross-section of the conventional actuator 10 taken along line A-N. Referring to FIGS. 1A and 1B, the conventional actuator 10 is mainly comprised of a plurality of head gimbal assemblies 11a and 11b and a coil assembly 13 installed between the head gimbal assemblies 11a and 11b. The end, that is, a fantail molding portion, of the coil assembly 13 is molded with a voice coil 15. A head 17 is mounted on the right sides of the head gimbal assemblies 11a and 11b. The number of head gimbal assemblies depends on the number of mounted disks. The voice coil 15 forms a magnetic assembly, together with a magnet (not shown) installed on a base plate (not shown) under the actuator 10 so as to be opposite to the voice coil 15. The actuator 10 is rotated by an electromagnetic force created by the interaction between an electrical field generated by current flowing in the voice coil 15 and the magnetic field of the magnet, thereby moving the head 17 to a desired track on a disk.

FIG. 2 is an exploded perspective view of the component elements of the conventional actuator 10 shown in FIGS. 1A and 1B. Referring to FIG. 2, the coil assembly 13 molded with the voice coil 15 is interposed between the first and second gimbal assemblies 11a and 11b. A pivot bearing 12 is inserted into a hole 16a of the first head gimbal assembly 11a, a hole 16b of the coil assembly 13, and a hole 16c of the second head gimbal assembly 11b in sequence and combined by a retainer nut 14, thereby competing the conventional actuator 10. Here, the pivot bearing 12 acts as the center around which the actuator 10 rotates.

Referring to FIGS. 1B and 2, the entire size of the conventional actuator 10 is increased due to the coil assembly 13 separately installed between the first and second head gimbal assemblies 11a and 11b, and according to this, a disk drive adopting the conventional actuator 10 becomes thicker.

Currently, most current mobile micro-drive apparatuses have a CompactFlash type I (CF-I) form which provides a thickness of 3.3 mm, and their application range is gradually extending. On the other hand, conventional IBM micro-drive apparatuses are excellent in terms of capacity, unit cost per storage capacity, and future competitiveness but adopt a CF-II form which provides a thickness of 5.0 mm because they cannot become slim due to the above-described actuator structure. Conventional CF-II actuators maximize a resonance characteristic, which is one of structure vibration characteristics, by positioning the coil assembly 13 between two channels, that is, between the first and second head gimbal assemblies 11a and 11b as shown in FIG. 2. However, such an arrangement is not suitable for a slim CF-I actuator using a single channel. In particular, there is not enough space in which to combine a fantail molding portion because of the thickness of a uni-mount portion of a suspension. Thus, the demand of conventional IBM disk drive apparatuses have a limited demand because they cannot become ultra-slim and light for use in mobile disk drives.

SUMMARY OF THE INVENTION

The present invention provides a slim actuator compatible with a CF-I actuator having a standard thickness of existing flash memory and a slim micro-drive apparatus adopting the slim actuator.

According to an aspect of the present invention, there is provided an actuator including: a suspension having a head mounted at one end to write/read data to/from a disk; and a head gimbal assembly comprised of a uni-mounting portion having one end connected to the suspension, a fantail molding portion extending from the other end of the uni-mounting portion, and a voice coil which is mounted on the fantail mounting portion such that current flows in the voice coil. The voice coil rotates the suspension by an electromagnetic force created by interaction between the electric field of the current and an applied magnetic field.

According to another aspect of the present invention, there is provided a micro-drive apparatus including a base plate, a spindle motor rotating a disk seated on the base plate, the above-described actuator, and a magnet assembly which is installed on the base plate such as to be opposite to the fantail molding portion of the actuator and applies the magnetic field to the voice coil of the actuator.

The head gimbal assembly has a thickness of 1 mm or less.

In contrast with conventional actuators in which a separate fantail molding portion is installed between head gimbal assemblies, an actuator according to the present invention has a fantail molding portion extending from a uni-mounting portion of a head gimbal assembly to remove unnecessarily wasted space (i.e., which is occupied by a separate fantail molding portion) and to achieve a slim actuator. Also, an ultra-slim mobile micro-drive apparatus can be obtained by using the slim actuator.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 1A:
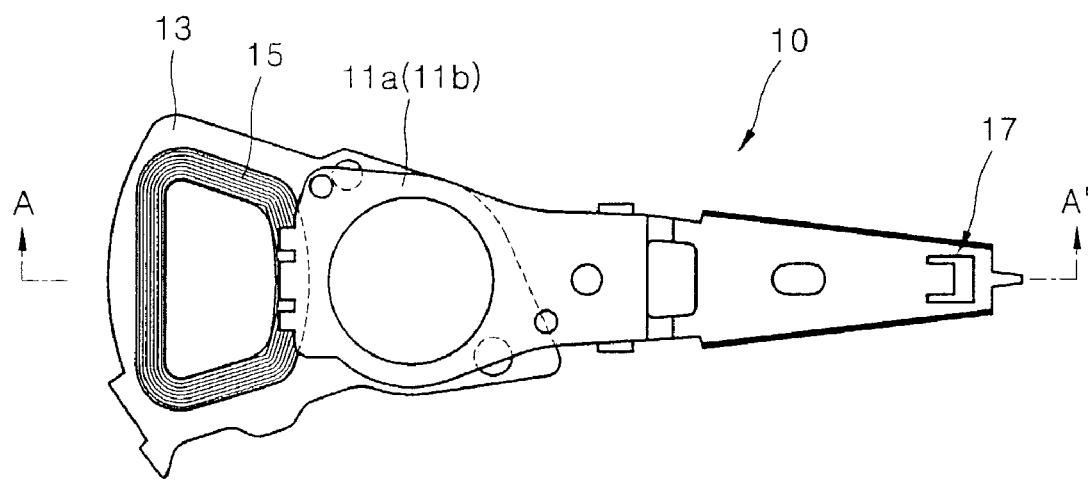
FIG. 1A is a plan view of an actuator included in a conventional IBM disk drive.
Figure 1B:
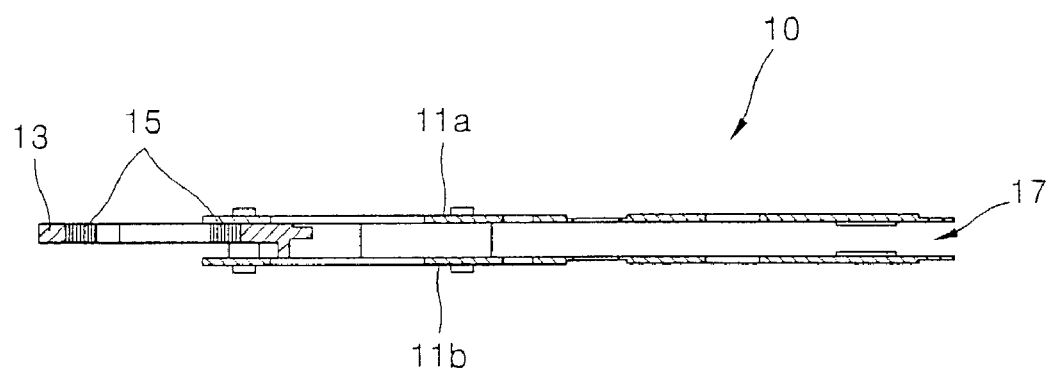
FIG. 1B is a side cross-section of the actuator of FIG. 1A.
Figure 2:
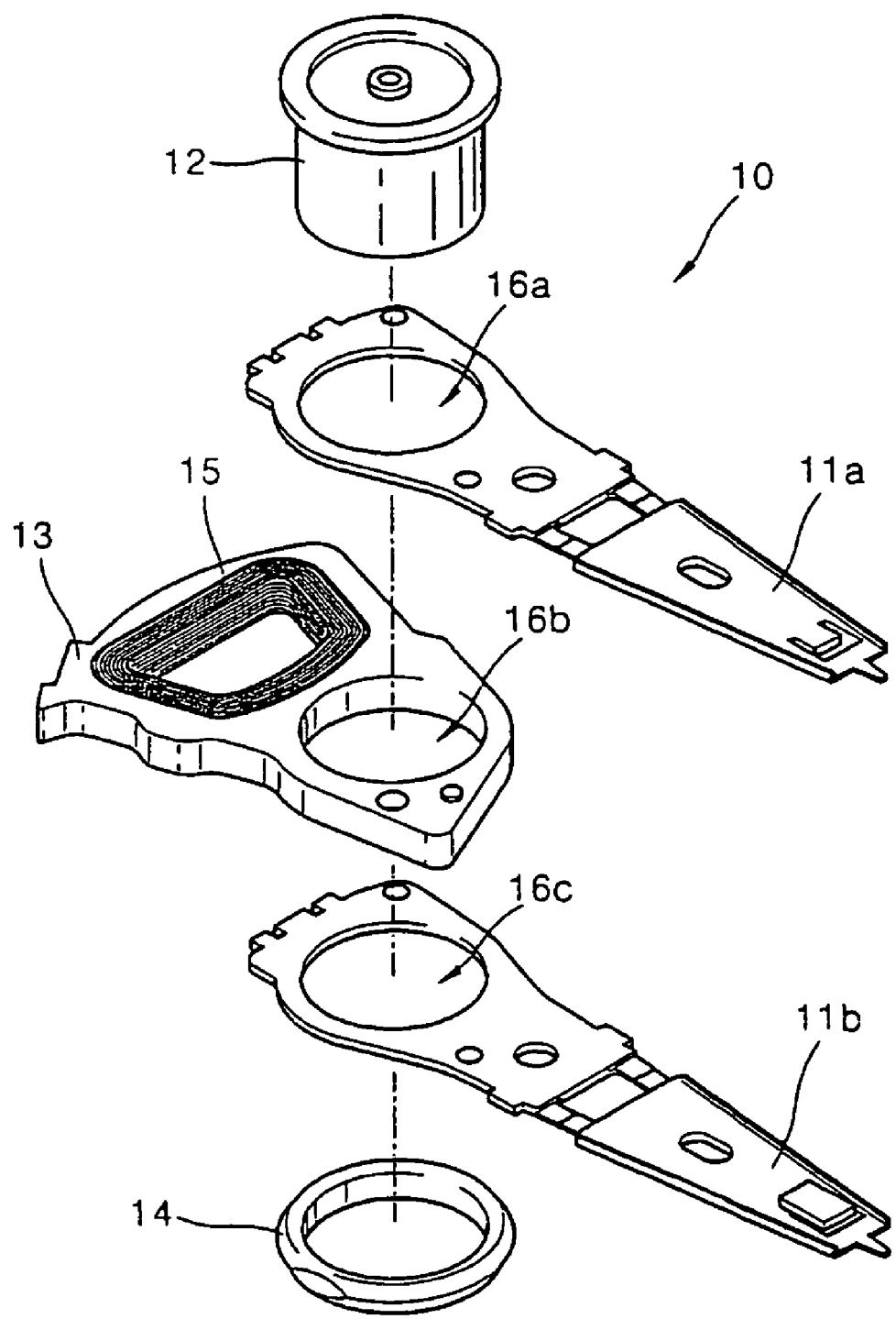
FIG. 2 is an exploded perspective view of the actuator of FIG. 1A.
Figure 3A:
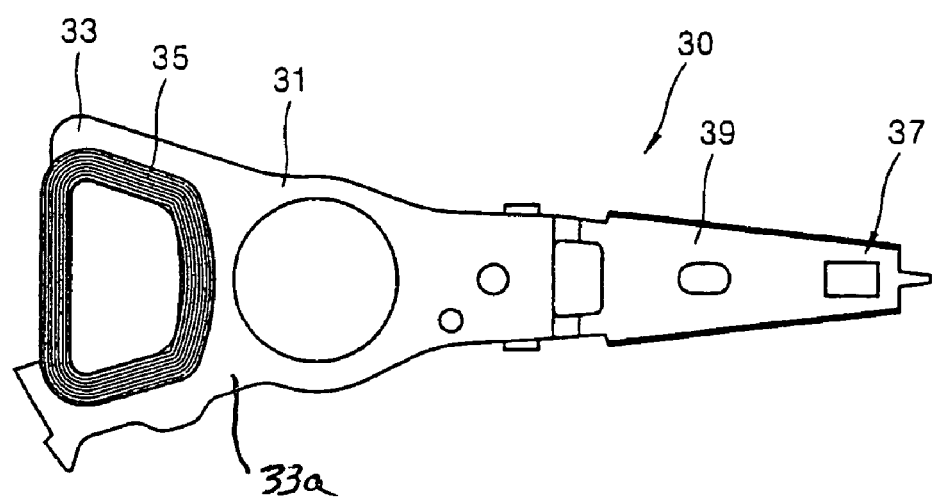
FIG. 3A is a plan view of an actuator according to an embodiment of the present invention.
Figure 3B:
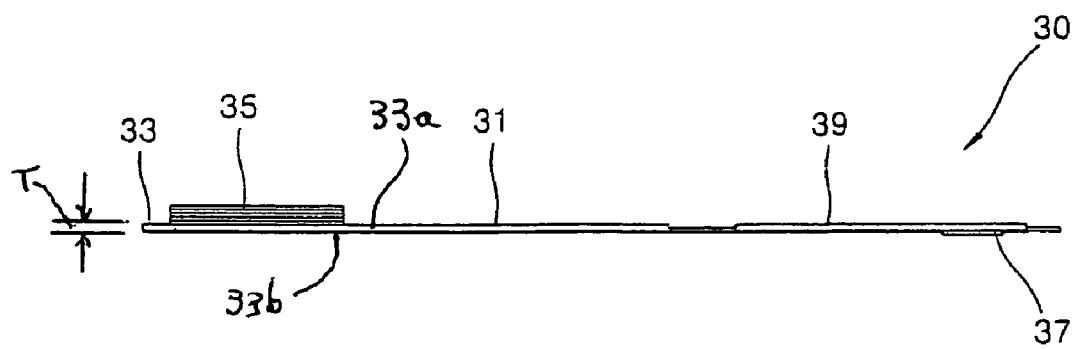
FIG. 3B is a side view of the actuator of FIG. 3A.

FIG. 3A is a plan view of an actuator 30 according to an embodiment of the present invention, and FIG. 3B is a side view of the actuator 30 of FIG. 3A. Referring to FIGS. 3A and 3B, the actuator 30 includes a single channel. An end extending from a uni-mounting portion of a head gimbal assembly 31 is a fantail molding portion 33, and a voice coil 35 is installed at the fantail molding portion 33. A portion extending from the other end of the head gimbal assembly 31 is a suspension 39 on which a head 37 is mounted. As shown in FIG. 3B, the actuator 30 is simply made slim by incorporating the fantail molding portion 33 into the head gimbal assembly 31.

Figure 4:
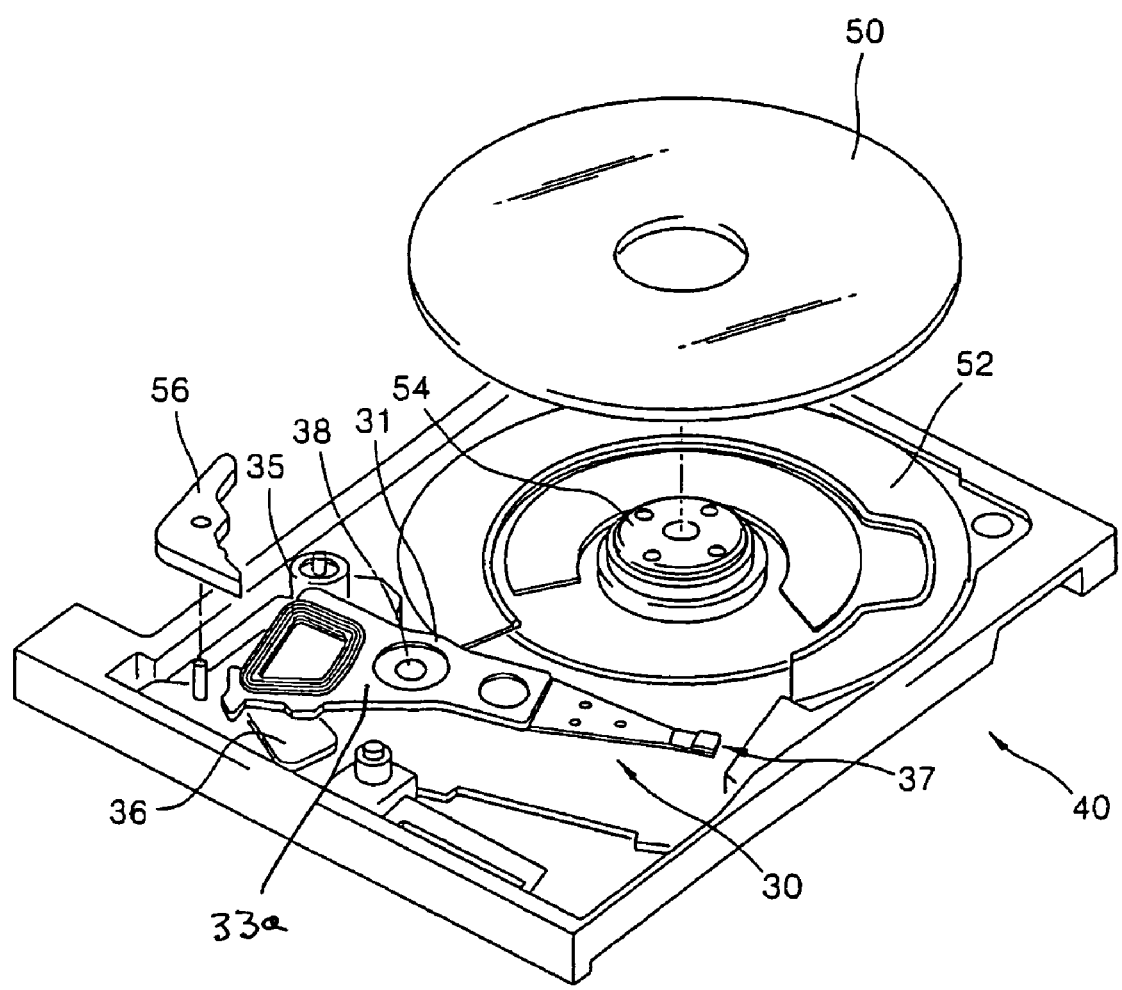
FIG. 4 is an exploded perspective view of a micro-drive apparatus according to an embodiment of the present invention.

FIG. 4 is an exploded perspective view of a micro-drive apparatus 40 including the actuator 30 according to an embodiment of the present invention. Referring to FIG. 4, the micro-drive apparatus 40 includes a disk 50 which stores information, a locking area 52 on which the disk 50 is seated, a spindle motor 54 which rotates the seated disk 50, the actuator 30 having the head 37 capable of recording/reproducing data to/from the disk 50, and a voice coil motor (not shown) comprised of a magnet assembly 36 and the voice coil 35 which drives the actuator 30.

The actuator 30 receives an electrical signal from a printed circuit board (PCB; not shown) via a flexible printed circuit (FPC; not shown).

The disk 50 is comprised of a parking zone minutely formed by laser at the inner area of the disk 50 and is fitted onto the spindle motor 54 so that the head 37 can be parked in the parking zone upon power-off. A data zone can be formed at the outside of the parking zone to record a magnetic signal on the data zone. The data zone has several tens of thousands of tracks on which a servo signal indicating locations where data is to be recorded has already been recorded along the circular shape of the disk 50.

The actuator 30 includes the voice coil motor (not shown) which drives the actuator 30, a pivot bearing 38 around which the actuator 30 rotates, and the head 37 which has a write head to write data to the disk 50 and a read head to read data from the disk 50. In particular, the actuator 30 is made very slim by attaching the voice coil 35 to the fantail molding portion 33, which is formed by extending the uni-mounting portion of the head gimbal assembly 31.

The PCB sends an electrical signal to the FPC, and the FPC transmits the received electrical signal to the actuator 30. The electrical signal received by the actuator 30 is transmitted to the voice coil 35. An electromagnetic force created by an interaction between the electric field of the current flowing in the voice coil 35 and a magnetic field of the magnet assembly 36 rotates the actuator 30 around the pivot bearing 38 to move the actuator 30 from the parking zone to the data zone. Here, reference numeral 56 denotes a latch which locks the actuator 30.

Figure 5:
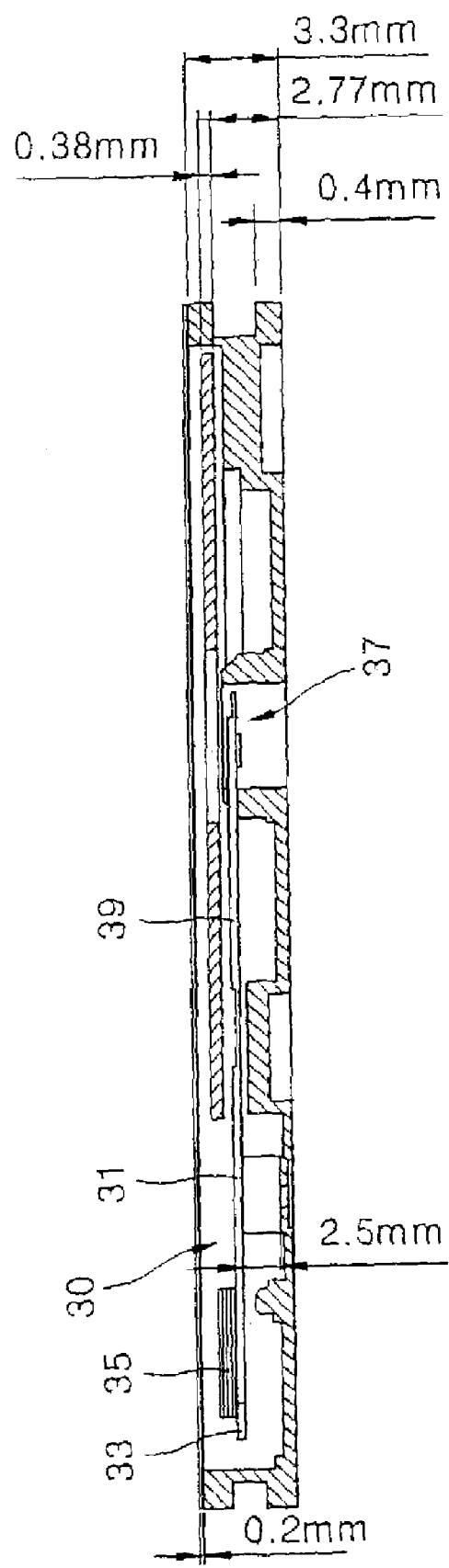
FIG. 5 is a side cross-section of a micro-drive apparatus according to another embodiment of the present invention.

FIG. 5 is a side cross-section of a micro-drive apparatus manufactured using a CF-II form according to another embodiment of the present invention. Referring to FIG. 5, the thickness of the micro-drive apparatus is 3.3 mm, the thickness of a seated disk is 0.38 mm, the height of a spindle motor is 2.77 mm, the thickness of a PCB is 0.4 mm, the thickness of a cover is 0.2 mm, and the height of a pivot bearing is 2.5 mm.

The micro-drive apparatus of FIG. 5 includes a top-positioning actuator in which a voice coil 35 is situated on the top of a head gimbal assembly 31. Thus, resonance characteristics may be less pronounced in the top-positioning actuator than in a conventional center-positioning actuator in which a voice coil is installed between two head gimbal assemblies.

Figure 6A:
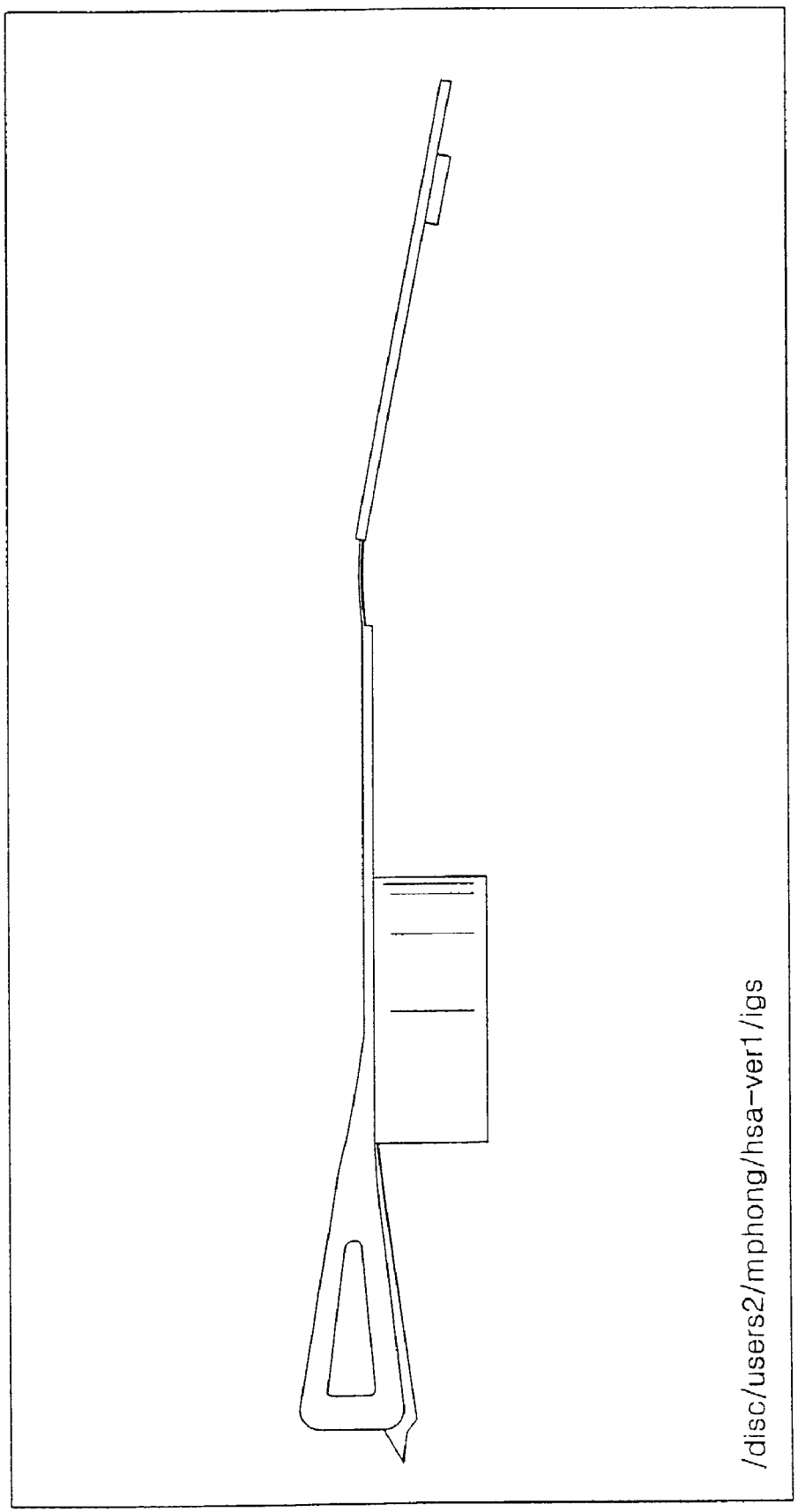
FIG. 6A is a simulation diagram showing the resonance characteristics of a top-positioning actuator according to an embodiment the present invention.
Figure 6B:
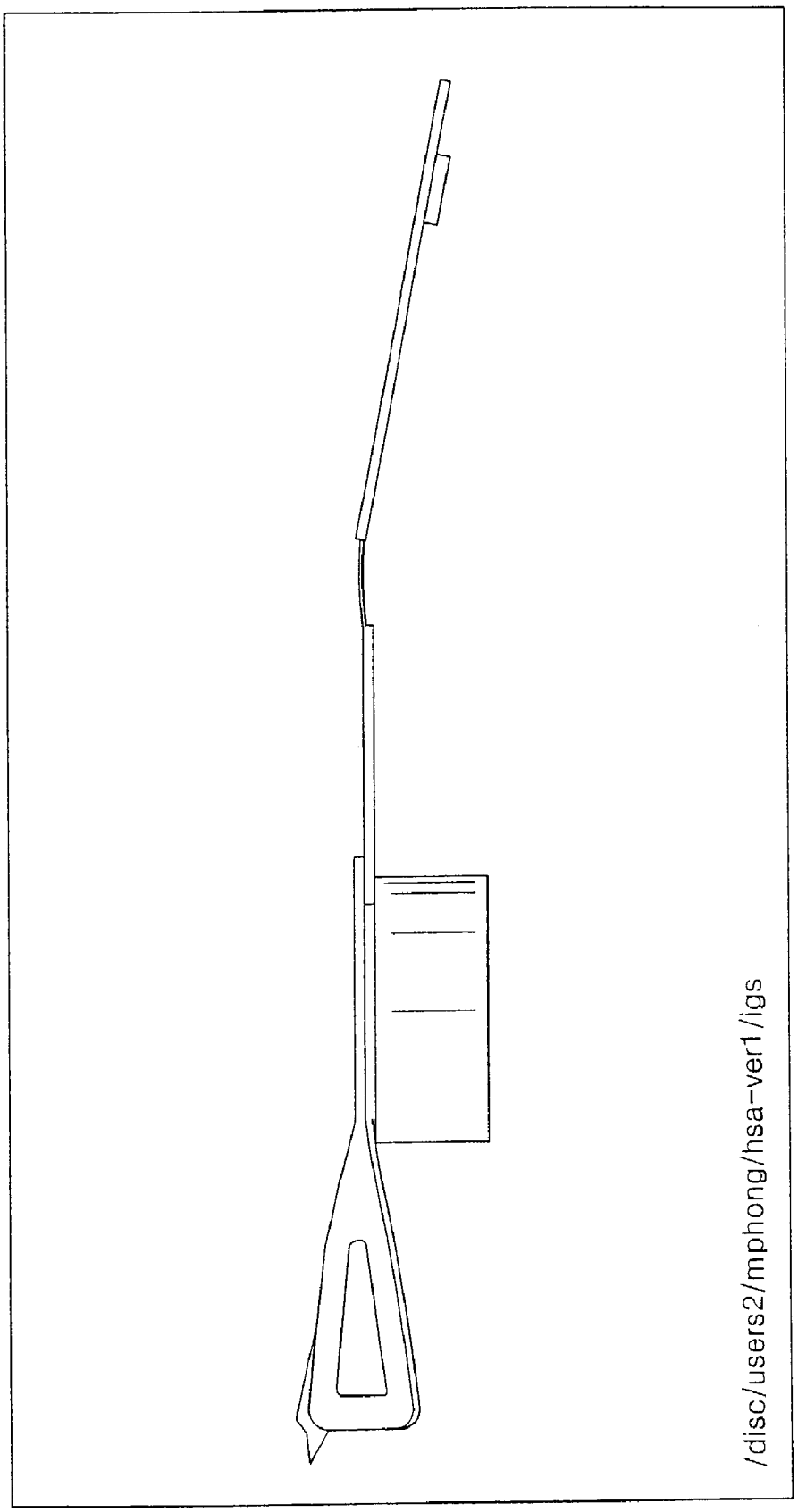
FIG. 6B is a simulation diagram showing the resonance characteristics of a conventional center-positioning actuator.

FIG. 6A shows the results of a simulation of the resonance characteristics of a voice coil motor (VCM) of a top-positioning actuator according to an embodiment of the present invention. FIG. 6B shows the results of a simulation of the resonance characteristics of a VCM of a conventional center-positioning actuator.

The top-positioning actuator of FIG. 6A has a resonance characteristic of 3245 Hz, and the center-positioning actuator of FIG. 6B has a resonance characteristic of 3259 Hz. Hence, there is no big difference between the resonance characteristics of the two actuators. Thus, the actuator according to an embodiment of the present invention has an excellent resonance characteristic similar to that of a conventional actuator.

In the actuator according to an embodiment of the present invention, the fantail molding portion 33 for molding the voice coil motor is formed by extending the uni-mounting portion of the head gimbal assembly 31. Accordingly, the actuator is slim, which makes it possible to make a slimmer and lighter disk drive apparatus including the actuator.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the actuator according to the present invention can be applied to both CF-I and CF-II disk drive apparatuses and further to disk drive apparatuses of newly proposed forms.

As described above, ultra-slim mobile disk drive apparatuses can be obtained by using slim actuators according to the present invention.

What is claimed is:

1. A micro-drive apparatus comprising:
   a base plate;
   a spindle motor rotating a disk seated on the base plate;
   an actuator including a suspension having a head mounted on a top surface at one end of the suspension to write/read data to/from the disk and a head gimbal assembly comprised of a uni-mounting portion having one end connected to the suspension, a fantail molding portion integrally extending from the other end of the uni-mounting portion, and a voice coil mounted on the top surface of the fantail molding portion such that current flows in the voice coil, wherein the voice coil rotates the suspension by an electromagnetic force created by interaction between the electric field of the current and an applied magnetic field; and
   a magnet assembly installed on the base plate such as to be opposite to a bottom surface of the fantail molding portion and applying the magnetic field to the voice coil,
   wherein the head gimbal assembly, fantail molding portion, and the suspension are integrated so that they are coplanar.

2. The micro-drive apparatus of claim 1, wherein the uni-mounting portion has a hole into which is fitted a pivot bearing around which the suspension rotates.

3. The micro-drive apparatus of claim 1, wherein the bottom surface of the fantail molding portion faces downwardly.

4. The micro-drive apparatus of claim 1, wherein the magnet assembly includes a printed circuit board mounted to the base plate and including a flexible printed circuit that transmits an electrical signal to activate the voice coil and drive the actuator.

5. The micro-drive apparatus of claim 1, wherein the head gimbal assembly has a thickness of 1 mm or less.

6. A micro-drive apparatus comprising:
- a base plate;
- a spindle motor rotating a disk seated on the base plate;
- an actuator having a first portion and a second portion, wherein the first portion includes a suspension having read/write head mounted at a first end and on a first surface of the actuator, and the second portion includes a head gimbal assembly having a fantail molding portion that integrally extends from a second end of the actuator and a voice coil mounted on the fantail molding portion on the first surface of the actuator; and
- a printed circuit board mounted to the base plate and including a flexible printed circuit that transmits an electrical signal to activate the voice coil and drive the actuator,
- wherein the first portion and second portion are integrated so that they are coplanar.

7. The micro-drive apparatus of claim 1, wherein the head gimbal assembly comprises:
- a uni-mounting portion including a hole having a pivot bearing around which the suspension rotates fitted therein.

* * * * *